US012769553B2

(12) United States Patent
Tessarolo et al.

(10) Patent No.: US 12,769,553 B2
(45) Date of Patent: Oct. 20, 2026

(54) MULTI-CONDITION BRANCH INSTRUCTION FOR CONDITIONAL BRANCH OPERATIONS

(71) Applicant: TEXAS INSTRUMENTS INCORPORATED, Dallas, TX (US)

(72) Inventors: Alexander Tessarolo, Lindfield (AU); Venkatesh Natarajan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 52 days.

(21) Appl. No.: 18/603,815

(22) Filed: Mar. 13, 2024

(65) Prior Publication Data

US 2024/0427602 A1 Dec. 26, 2024

(30) Foreign Application Priority Data

Jun. 23, 2023 (IN) ............................. 202341042580

(51) Int. Cl.
*G06F 9/30* (2018.01)
*G06F 9/38* (2018.01)

(52) U.S. Cl.
CPC ........ *G06F 9/3804* (2013.01); *G06F 9/30058* (2013.01); *G06F 9/30061* (2013.01); *G06F 9/30145* (2013.01)

(58) Field of Classification Search
CPC ............... G06F 9/3804; G06F 9/30058; G06F 9/30061; G06F 9/30145
See application file for complete search history.

(56) References Cited

U.S. PATENT DOCUMENTS 5,353,421 A * 10/1994 Emma ................... G06F 9/3806 712/240
5,903,750 A * 5/1999 Yeh ..................... G06F 9/30061 712/236
6,820,193 B1 * 11/2004 Ostler ................... G06F 9/3804 712/E9.056
8,578,140 B2 * 11/2013 Yokoi ................... G06F 9/3806 712/239
9,703,565 B2 * 7/2017 Burger ................ G06F 9/45516
10,048,969 B2 * 8/2018 Okazaki ................ G06F 9/3844
(Continued)

*Primary Examiner* — Corey S Faherty
(74) *Attorney, Agent, or Firm* — Michelle F. Murray; Charles F. Koch

(57) ABSTRACT

Various embodiments of the present disclosure relate to the conditional execution of program code. In an example embodiment, a system including instruction fetch circuitry, decoder circuitry, and multi-condition branch circuitry is provided. The instruction fetch circuitry is configured to fetch a multi-condition branch instruction (MCBI) from memory. The MCBI identifies multiple status registers and multiple branch destinations. The multiple status registers of the MCBI are representative of registers which hold results of multiple condition evaluations, such that each status register corresponds to a different one of the multiple condition evaluations. Similarly, the multiple branch destinations of the MCBI also correspond to a different one of the multiple condition evaluations. The instruction fetch circuitry provides the MCBI to the decoder circuitry. In response, the decoder circuitry is configured to cause the multi-condition branch circuitry to execute the multi-condition branch instruction.

20 Claims, 11 Drawing Sheets

(56) References Cited

U.S. PATENT DOCUMENTS

| | | | | |
|---|---|---|---|---|
| 10,268,480 | B2 * | 4/2019 | Chheda | G06F 9/3848 |
| 10,430,198 | B2 * | 10/2019 | Gupta | G06F 9/3832 |
| 2009/0177874 | A1 * | 7/2009 | Terashima | G06F 9/30094 712/E9.016 |

* cited by examiner

MULTI-CONDITION BRANCH INSTRUCTION FOR CONDITIONAL BRANCH OPERATIONS

CROSS-REFERENCE TO RELATED APPLICATIONS

This application is related to, and claims the benefit of priority to, India Provisional Patent Application No. 202341042580, filed on Jun. 23, 2023, and entitled "A technique for optimizing decision tree and switch statement execution in a CPU", which is hereby incorporated by reference in its entirety.

TECHNICAL FIELD

This disclosure relates generally to computing hardware and software and, in particular, to multi-condition branch instructions.

BACKGROUND

Conditional execution describes a method of executing program code in a non-sequential fashion. A conditional branch statement is representative of a type of program statement which supports the conditional execution of a program. For example, a conditional branch statement, when compiled down to assembly code, may result in program instruction(s) to branch to another part of the program upon a specified condition being true.

A switch statement is representative of a type of multi-condition branch statement. Generally, a switch statement identifies multiple execution cases and a corresponding condition evaluation for each of the multiple execution cases. An execution case is representative of a program function that is executed when the corresponding condition evaluation is true. For example, a switch statement may identify two execution cases, such that the program branches to the first execution case when the first condition evaluation is true, or instead branches to the second execution case when the second condition evaluation is true.

Current methods for executing switch statements include a series of compare and branch instructions. For example, in the switch statement above, current techniques may utilize a first compare instruction for performing the first condition evaluation, followed by a first branch instruction for determining where to branch to in the program code. If the first condition evaluation is true, then the program branches to the first execution case, else the program continues sequentially to the second compare instruction. If the program continues to the second compare instruction, then the second compare instruction is followed by a second branch instruction which determines where to proceed next in the program.

Problematically, many current methods for executing switch statements (and other multi-condition branch statements) are limited to checking one condition at a time. As a result, devices that implement conditional branching techniques can be expensive in execution cycles.

SUMMARY

Disclosed herein are improvements to the compilation and execution of conditional branch statements. In various example embodiments, a multi-condition branch instruction (MCBI) is introduced that directs a processing system, or components thereof, to perform a conditional branch operation based on the results of multiple condition evaluations.

In one example embodiment, a system includes instruction fetch circuitry, decoder circuitry coupled to the instruction fetch circuitry, and multi-condition branch circuitry coupled to the decoder circuitry. The instruction fetch circuitry fetches a multi-condition branch instruction (MCBI) from memory. The MCBI identifies multiple status registers and multiple branch destinations. The multiple status registers of the MCBI are representative of registers which hold results of multiple condition evaluations, such that each status register corresponds to a different one of the multiple condition evaluations. Similarly, the multiple branch destinations of the MCBI also correspond to a different one of the multiple condition evaluations. The instruction fetch circuitry provides the MCBI to the decoder circuitry. In response, the decoder circuitry causes the multi-condition branch circuitry to execute the MCBI.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
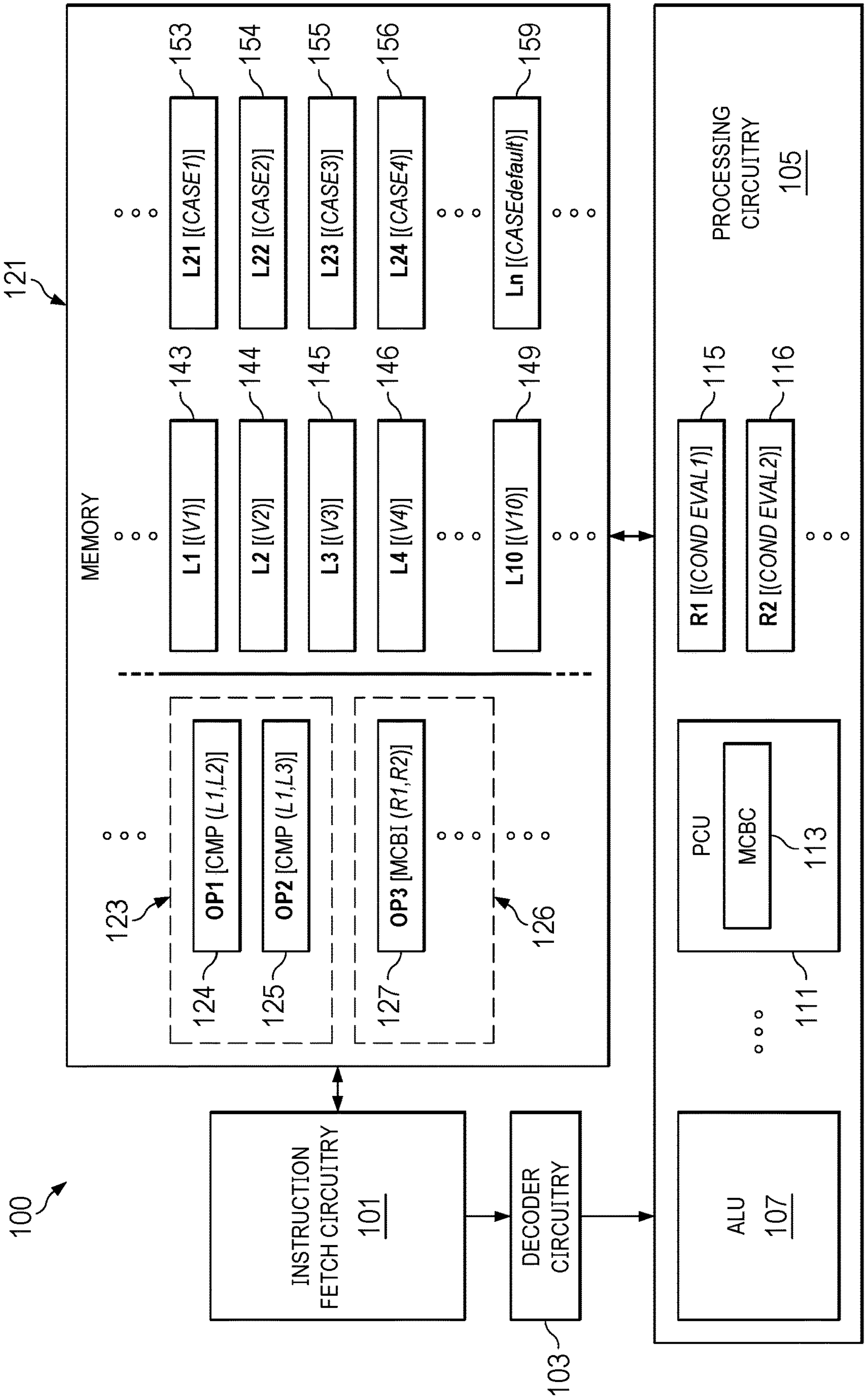
FIG. 1 illustrates an operating environment in an implementation.

Technology is disclosed herein for the improved execution of conditional branch statements. A conditional branch statement describes a type of program statement which allows for the conditional execution of program code. Conditional execution describes a decision-making technique utilized within instruction set architectures (ISAs) for determining a pathway through the code.

Generally, conditional branch statements identify one or more conditions to be evaluated and one or more branch destinations to be selected among based on the conditions. For example, a switch statement is representative of a type of multi-condition branch statement that identifies multiple condition evaluations and a corresponding set of branch destinations. The condition evaluations of the switch statement are representative of comparison operations performed between two values. For example, a condition evaluation may determine if a value stored in a first register is equal to a value stored in a second register. If equal, the condition evaluation is true, else the condition evaluation is false. The branch destinations of the switch statement are representative of memory locations that store program functions. When executed, a switch statement causes the executing device (e.g., central processing unit (CPU)) to perform the multiple condition evaluations and determine the appropriate branch destination to branch to based on the results of the multiple condition evaluations.

Existing techniques for executing multi-condition branch statements can require multiple execution cycles to complete. For example, a switch statement that identifies two condition evaluations and two branch destinations, may require multiple execution cycles to complete: 1) one or more execution cycles for performing the first condition evaluation and the first branch operation; and 2) one or more execution cycles for performing the second condition evaluation and the second branch operation (for when the result of the first condition evaluation is false). In contrast, disclosed herein is a new multi-condition branch instruction (MCBI) that executes multi-condition branch statements, such as switch statements, within the same cycle overhead that would have been taken to execute a single conditional branch instruction (CBI). Meaning, the new MCBI, which identifies multiple conditions, may be executed in the same number of cycles as a CBI which only identifies a single condition.

To begin, the condition evaluations of the same switch statement, when expressed in assembly code, are compiled into two compare instructions, the results of which are stored in two registers. The examination of those results-rather than taking two execution cycles to complete, is accomplished in a single execution cycle by the new MCBI. The new MCBI takes the results of the two condition evaluations as input and examines their results to determine the appropriate destination to branch to. Advantageously, the new MCBI allows the same multi-condition branch statement to be executed in the same amount of cycles that would have been taken to execute a CBI.

In an example embodiment, a system including instruction fetch circuitry, decoder circuitry coupled to the instruction fetch circuitry, and multi-condition branch circuitry coupled to the decoder circuitry is provided. The instruction fetch circuitry is configured to fetch a multi-condition branch instruction (MCBI) from a memory and provide the MCBI to the decoder circuitry. In response, the decoder circuitry causes the multi-condition branch circuitry to execute the MCBI.

The MCBI is representative of a program instruction which identifies multiple status registers and multiple branch destinations. The multiple status registers of the MCBI are representative of registers which store results of multiple condition evaluations, such that each status register stores a result of a different condition evaluation. In an implementation, the result of a condition evaluation is indicative to whether a comparison operation was true or false. As such, the multiple status registers store indications to whether a first set of comparison operations were true or false. The multiple branch destinations of the MCBI are representative of memory locations which store program functions that correspond to the results of the multiple condition evaluations.

In an implementation, the multiple status registers include a first status register that stores a first condition evaluation result, and a second status register that stores a second condition evaluation result. The first condition evaluation result is representative of an indicator to whether a first comparison operation between a first variable and a second variable is true or false. The second condition evaluation result is representative of an indicator to whether a second comparison operation between the first variable and a third variable is true or false. As such, the multiple branch destinations include a first branch destination that corresponds to the first condition evaluation result and a second branch destination that corresponds to the second condition evaluation result.

When executed, the MCBI causes the multi-condition branch circuitry to determine the appropriate branch destination to provide to the instruction fetch circuitry. If the first condition evaluation result indicates the first comparison operation is true, then the multi-condition branch circuitry provides the first branch destination to the instruction fetch circuitry. Alternatively, if the first condition evaluation result indicates the first comparison operation is false and the second condition evaluation result indicates the second comparison operation is true, then the multi-condition branch circuitry provides the second branch destination to the instruction fetch circuitry. In an implementation, if the first and second condition evaluation results indicate the first and second comparison operations are false, then the multi-condition branch circuitry indicates that no branching is required, and instruction execution can continue with the next instruction.

Advantageously, the disclosed technology improves the efficiency of systems that utilize conditional branching techniques. Existing solutions for executing multi-condition branch statements were limited to checking one condition at a time. As such, existing solutions require numerous execution cycles to perform conditional branching operations. Instead, described herein, are systems and methods for executing a multi-condition branch statement with the same cycle penalty as a single conditional branch statement thereby reducing the time and code size required for executing the multi-condition branch statement.

Now turning to the figures, FIG. 1 illustrates operating environment 100 in an implementation. Operating environment 100 is representative of an example operating environment configurable to execute program code, such as multi-condition branch instructions (MCBIs). Operating environment 100 includes instruction fetch circuitry 101, decoder circuitry 103, processing circuitry 105, and memory 121. In some embodiments, the elements shown in operating environment 100 may be included inside a processing system, such as a microcontroller unit (MCU) or a central processing unit (CPU). In some embodiments, some of the elements shown in operating environment 100 may be included outside of a processing system.

Instruction fetch circuitry 101 is representative of circuitry configured to fetch instructions from a memory and provide the instructions to a decoder. For example, instruction fetch circuitry 101 may fetch instructions from memory 121 and provide the instructions to decoder circuitry 103. In an implementation, instruction fetch circuitry 101 is configured to fetch instruction packets from memory 121. For example, instruction fetch circuitry 101 may first fetch instruction packet 123 in a first clock cycle and fetch instruction packet 126 in a subsequent clock cycle.

Decoder circuitry 103 is representative of circuitry configured to decode instructions which were fetched from memory. For example, instruction fetch circuitry 101 may fetch an instruction packet from memory 121 and provide the fetched instructions to decoder circuitry 103. In response, decoder circuitry 103 decodes the fetched instructions of the instruction packet and routes the decoded instructions to the appropriate circuitry of processing circuitry 105. It should be noted that while only one decoder is illustrated in FIG. 1 (i.e., decoder circuitry 103), several decoders or decoder circuits may be included in operating environment 100. For example, each circuit of processing circuitry 105 may include separate decoder circuitries.

Processing circuitry 105 is representative of one or more circuits capable of executing program instructions. Processing circuitry 105 may be coupled to instruction fetch circuitry 101, decoder circuitry 103, and memory 121. Processing circuitry 105 includes, but is not limited to, arithmetic logic unit (ALU) 107, program control unit (PCU) 111, register 115, and register 116.

ALU 107 is representative of circuitry configured to perform arithmetic logic operations. For example, ALU 107 may perform various comparison operations, such as determining if a value stored in a first register is less than, greater than, and/or equal to a value stored in a second register. Output of ALU 107 may be stored by memory 121 or analyzed by respective circuitry. For example, PCU 111 may analyze the output of ALU 107 to determine which instruction should be executed next. It should be noted that while only one arithmetic logic unit is illustrated in FIG. 1 (i.e., ALU 107), several arithmetic logic units may be included in operating environment 100.

PCU 111 is representative of circuitry configured to manage the execution of program code. In various examples, PCU 111 directs instruction fetch circuitry 101 to fetch certain instructions in a specific order as other circuitries, such as ALU 107, execute instructions during run-time operations. PCU 111 is further representative of circuitry configured to perform condition evaluations. A condition evaluation is representative of an analysis performed on the results of a comparison operation. For example, ALU 107 may perform a comparison operation and PCU 111 may evaluate the output of ALU 107 to determine if the comparison operation satisfies a specified condition. A condition of a condition evaluation is representative of a desired output for the comparison operation. For example, the condition may desire a variable stored by a first register to be equal to a variable stored by a second register. If the condition is satisfied, then PCU 111 outputs a true indication (e.g., 1), else PCU 111 outputs a false indication (e.g., 0). Output of PCU 111 is stored by the registers of processing circuitry 105. For example, if PCU 111 determines a first condition is satisfied, then PCU 111 may store a one in register 115, else PCU 111 may store a zero in register 115. In an implementation, PCU 111 includes, but is not limited to, multi-condition branch circuitry (MCBC) 113.

MCBC 113 is representative of circuitry configured to execute multi-condition branch instructions (MCBIs) within a single execution cycle or the cycles taken for a single conditional branch. In this context, a single execution cycle includes both a condition where the processing circuitry 105 is able to proceed from receipt of an instruction to a result in a single clock cycle as well as a pipelined architecture where the processing circuitry 105 takes several clock cycles to proceed from receipt of an instruction to a result but the instruction takes up only a single slot in the pipeline. In this latter case, a first instruction may permit a second instruction to complete in the clock cycle immediately before the first instruction completes and may permit a third instruction to complete in the clock cycle immediately after the first instruction completes. Thus, in effect, the first instruction only delays the subsequent third instruction by one clock cycle.

An MCBI is representative of an instruction which identifies multiple status registers and multiple branch destinations. The multiple status registers are representative of registers which store condition evaluation results, such as the registers of processing circuitry 105. The multiple branch destinations are representative of locations in memory 121 which store various program functions. When an MCBI is executed, MCBC 113 analyzes the condition evaluation results stored by the status registers (i.e., register 115 and register 116) to determine the appropriate branch destination. In an implementation, MCBC 113 outputs the appropriate branch destination to instruction fetch circuitry 101. In response, instruction fetch circuitry 101 fetches the instruction which corresponds with the appropriate branch destination from memory 121. It should be noted that, while illustrated within PCU 111, MCBC 113 may reside outside of PCU 111.

Registers 115 and 116 are representative of locations that store data and/or instructions for use during the execution of program code. Registers 115 and 116 may be architecturally distinct and/or be portions (e.g., distinct bits) of a single larger register. In an implementation, registers 115 and 116 are representative of the status registers which store condition evaluation results. For example, PCU 111 may output condition evaluation results to registers 115 and 116 and MCBC 113 analyzes the data stored by registers 115 and 116 to form a determination. It should be noted that while only two registers are illustrated, processing circuitry 105 may contain more than two registers.

Memory 121 is representative of one or more volatile or non-volatile computer-readable storage media including instructions, data, and the like (e.g., random access memory, flash memory). For example, memory 121 stores instruction packets 123 and 126, and includes memory locations 143, 144, 145, 146, 149, 153, 154, 155, 156, and 159. The instruction packets of memory 121 are representative of packets of one or more instructions which direct the processing units of processing circuitry 105 to perform various operations within a single execution cycle or the cycles taken for a single conditional branch. The memory locations of memory 121 are representative of locations in memory which store data. For example, the data of the memory locations may include values, program functions, or data of the like.

Instruction packet 123 is representative of a first packet of instructions which may be executed in a single execution cycle. Instruction packet 123 includes instruction 124 and instruction 125. Instructions 124 and 125 are representative of condition evaluations which each identify a comparison operation (e.g., greater than, less than, equal to, etc.) to be performed, memory locations which store data for performing the comparison operation, and a condition for a result of the comparison operation. When executed, instruction packet 123 causes ALU 107 to perform the comparison operations identified by instructions 124 and 125 and output results of the comparison operations to PCU 111. PCU 111 then evaluates the output of ALU 107 to determine whether the conditions of the instructions were satisfied.

For example, instruction 124 causes ALU 107 to compare the data stored by memory locations 143 and 144 and output a result to PCU 111. PCU 111 evaluates the output of ALU 107 and stores an indication to whether the condition of instruction 124 was satisfied in register 115. For example, if the condition of instruction 124 was satisfied, then PCU stores a true indication (e.g., 1) in register 115, else PCU 111 stores a false indication (e.g., 0). Additionally, or in the alternative, the ALU 107 may write directly to register 115. Similarly, instruction 125 causes ALU 107 to compare the data stored by memory locations 143 and 145 and output a result to PCU 111. PCU 111 evaluates the output of ALU 107 and stores an indication to whether the condition of instruction 125 was satisfied in register 116. In some examples, ALU 107 includes multiple sets of execution circuitry configured to execute instruction 124 and instruction 125 in parallel, and PCU 111 and/or ALU 107 is configured to write results of the comparisons to register 115 and register 116 in parallel.

Instruction packet 126 is representative of a second packet of instructions which may be executed in the same number of cycles taken for a single conditional branch instruction. In an implementation, instruction packet 126 is executed after the execution of instruction packet 123. Instruction packet 126 includes, but is not limited to, instruction 127. Instruction packet 126 may further include other instructions, such as condition evaluations, but for the purposes of explanation, instruction packet 126 depicts instruction 127.

Instruction 127 is representative of an MCBI that identifies multiple status registers and multiple branch destinations. When executed, instruction packet 126 causes MCBC 113 to determine the appropriate branch destination to provide instruction fetch circuitry 101 based on the results of instructions 124 and 125. For example, if the condition of instruction 124 was satisfied as indicated by register 115, then MCBC 113 provides memory location 153 to instruction fetch circuitry 101. Alternatively, if the condition of instruction 124 was not satisfied, but the condition of instruction 125 was satisfied as indicated by register 116, then MCBC 113 provides memory location 154 to instruction fetch circuitry 101. In an implementation, if neither condition of either instruction was satisfied, then MCBC 113 may provide memory location 159 to instruction fetch circuitry 101.

Memory locations 143, 144, 145, 146, and 149 are representative of memory locations that store values. Such values may include fixed-point numbers, floating-point numbers, or other values of the like. Alternatively, memory locations 153, 154, 155, 156, and 159 are representative of branch destinations that store program functions, herein referred to as execution cases. The execution cases of memory locations 153, 154, 155, 156, and 159 are representative of program instructions that PCU 111 may branch to.

Figure 2:
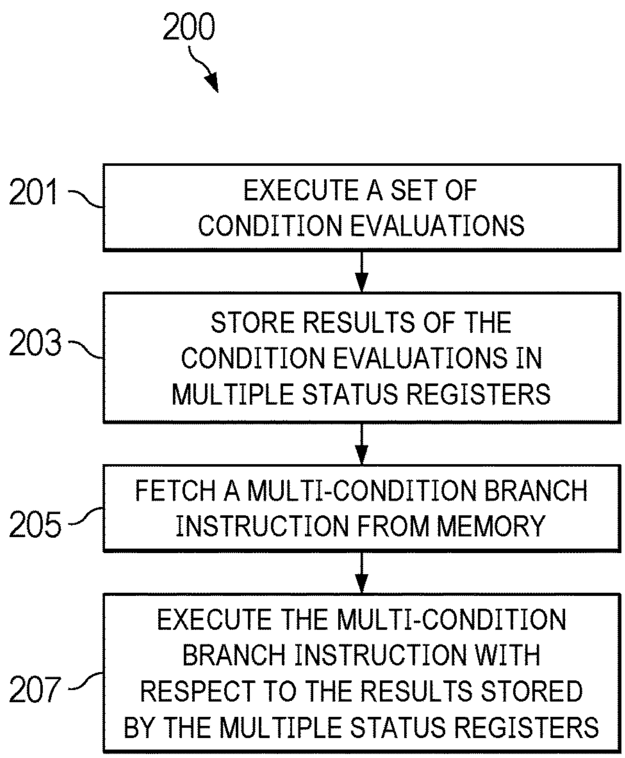
FIG. 2 illustrates a multi-condition branch process in an implementation.

FIG. 2 illustrates multi-condition branch (MCB) process 200 in an implementation. MCB process 200 may be implemented in the context of program instructions that, when executed by a suitable computing system, direct the processing circuitry of the computing system to operate as follows, referring parenthetically to the steps in FIG. 2. For the purposes of explanation, MCB process 200 will be explained with the elements of FIG. 1. This is not meant to limit the applications of MCB process 200, but rather to provide an example.

To begin, PCU 111 executes a first set of condition evaluations (step 201). For example, PCU 111 may execute instruction packet 123. Instruction packet 123 is representative of packet of instructions which includes instructions 124 and 125. Instructions 124 and 125 are representative of condition evaluations which direct ALU 107 and PCU 111 to determine if the data stored in the identified memory locations satisfies the conditions of the instructions. For example, instruction 124 directs ALU 107 and PCU 111 to determine if the data stored in memory locations 143 and 144 satisfies the condition of instruction 124. Similarly, instruction 125 directs ALU 107 and PCU 111 to determine if the data stored in memory locations 143 and 145 satisfies the condition of instruction 125. In an implementation, the conditions of instructions 124 and 125 determine if the value stored in the first memory location (i.e., memory location 143) is equal to the value stored in the second memory location (i.e., memory location 144 or memory location 145).

Next, PCU 111 stores the results of the condition evaluations in multiple status registers (step 203). In an implementation, PCU 111 stores the results of the condition evaluations in the registers of processing circuitry 105. For example, PCU 111 may store the results of instruction 124 in register 115 and the results of instruction 125 in register 116. If the condition was satisfied, PCU 111 stores a one, else PCU 111 stores a zero.

After evaluating the conditions of instructions 124 and 125, PCU 111 directs instruction fetch circuitry 101 to fetch an MCBI from memory 121 (step 205). For example, PCU 111 may direct instruction fetch circuitry 101 to fetch instruction packet 126 from memory 121. Once fetched, instruction fetch circuitry 101 provides instruction packet 126 to decoder circuitry 103. In response, decoder circuitry 103 decodes instruction packet 126 and causes MCBC 113 to execute instruction 127 with respect to the results stored by registers 115 and 116 (step 207). In particular, this may cause the MCBC 113 to determine which instruction should be executed next.

Figure 3:
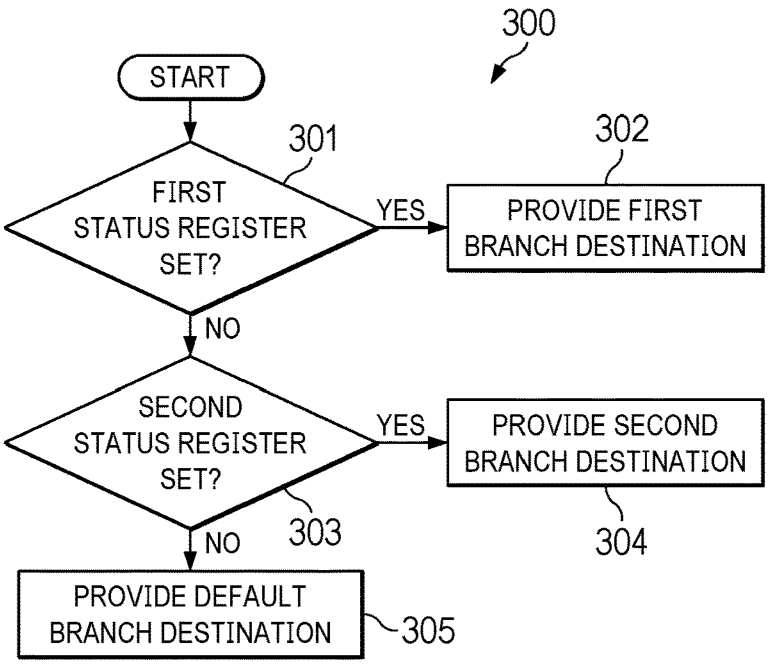
FIG. 3 illustrates another multi-condition branch process in an implementation.

FIG. 3 illustrates process 300 in an implementation. Process 300 is representative of a process for executing MCBIs. In an implementation, process 300 is representative of a sub-process for performing step 207 of MCB process 200. Process 300 may be implemented in the context of program instructions that, when executed by a suitable computing system, direct the processing circuitry of the computing system to operate as follows, referring parenthetically to the steps in FIG. 3.

To begin, MCBC 113 receives the decoded representation of instruction 127 from decoder circuitry 103, and in response, determines if the first status register is set (step 301). For example, MCBC 113 may determine if register 115 stores a one or a zero. If register 115 stores a one, MCBC 113 determines the first status register is set and in response provides the first branch destination to instruction fetch circuitry 101 (step 302). For example, MCBC 113 may provide memory location 153 to instruction fetch circuitry 101. In response, instruction fetch circuitry 101 fetches the instruction which corresponds with memory location 153. For some MCBI instructions, such as instruction 127, MCBC 113 need not evaluate the second status register (i.e., register 116) when the first status register is set.

Alternatively, if register 115 stores a zero, MCBC 113 determines the first status register is not set and in response determines if the second status register is set (step 303). For example, MCBC 113 may determine if register 116 stores a one or a zero. If register 116 stores a one, MCBC 113 determines the second status register is set and provides the second branch destination to instruction fetch circuitry 101 (step 304). For example, MCBC 113 may provide memory location 154 to instruction fetch circuitry 101 and in response, instruction fetch circuitry 101 fetches the instruction which corresponds to memory location 154.

When MCBC 113 determines the first and second status registers are not set, MCBC 113 provides a default branch destination to instruction fetch circuitry 101 (step 305). For example, MCBC 113 may provide memory location 159 to instruction fetch circuitry 101. The default branch destination is representative of a location in memory which stores default program instructions for when the conditions of instruction 124 and 124 are not satisfied. In an implementation, when neither status register is set, MCBC 113 notifies PCU 111 and in response, PCU 111 directs instruction fetch circuitry 101 to fetch the next instruction packet from memory 121. In other words, PCU 111 directs instruction fetch circuitry 101 to not branch in the program code, but rather continue fetching code linearly.

Figure 4A:
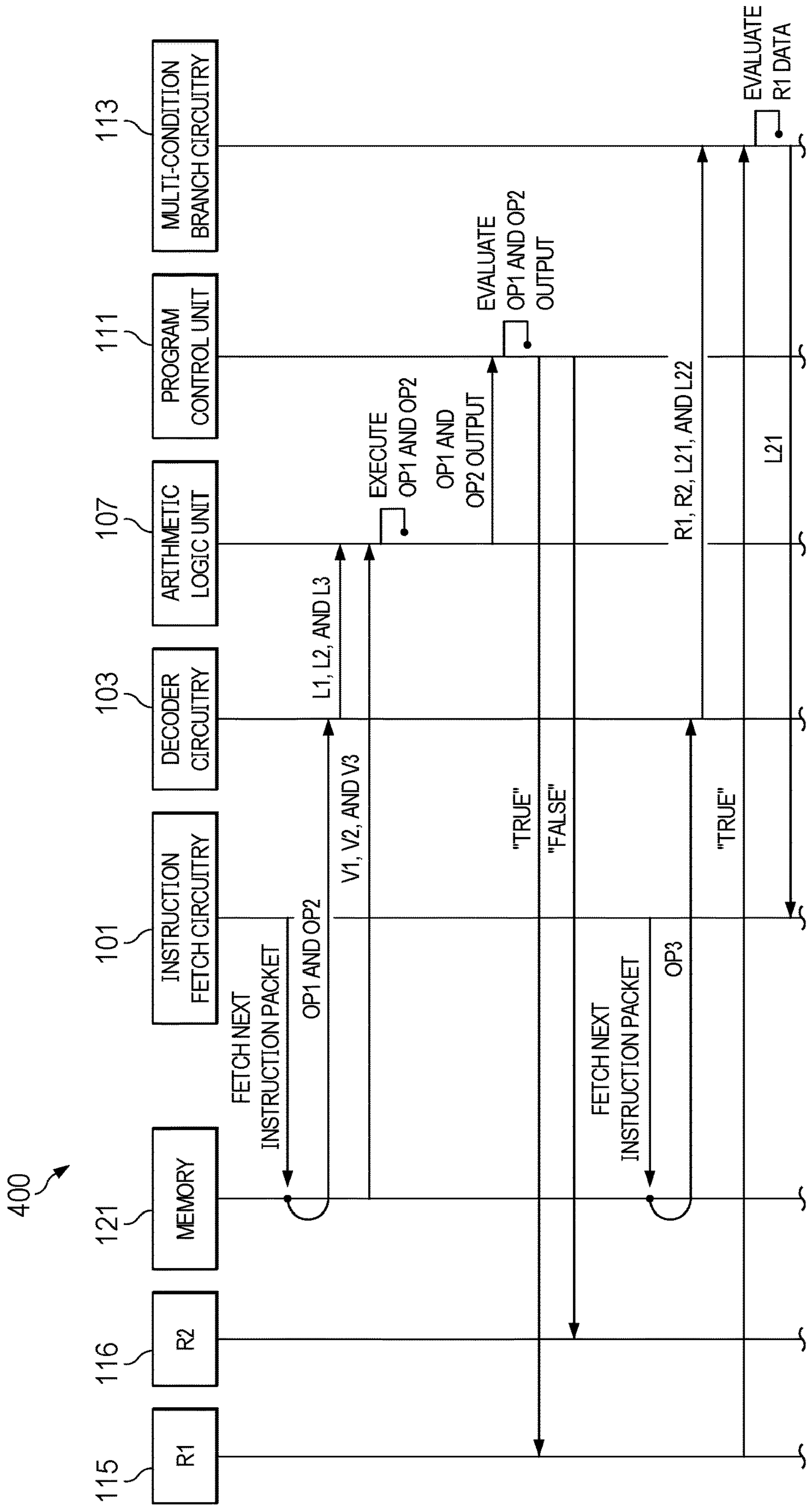
FIGS. 4A and 4B illustrate an operational sequence in an implementation.

FIG. 4A illustrates operational sequence 400 in an implementation. Operational sequence 400 illustrates an application of MCB process 200 and process 300 with respect to the elements of FIG. 1. As such, operational sequence 400 includes register 115, register 116, memory 121, instruction fetch circuitry 101, decoder circuitry 103, ALU 107, PCU 111, and MCBC 113.

To begin, instruction fetch circuitry 101 fetches an instruction packet from memory 121. For example, instruction fetch circuitry 101 may fetch instruction packet 123 from memory 121. Instruction packet 123 is representative of a packet of instructions which includes instruction 124 and instruction 125. Instruction 124 is representative of a condition evaluation (i.e., OP1) which identifies a first comparison operation, memory locations for performing the first comparison operation, and a condition for a result of the first comparison operation. Instruction 125 is representative of another condition evaluation (i.e., OP2) which identifies a second comparison operation, memory locations for performing the second comparison operation, and a condition for a result of the second comparison operation.

Instruction fetch circuitry 101 provides instructions 124 and 125 to decoder circuitry 103. Decoder circuitry 103 decodes instructions 124 and 125 and provides the relevant memory locations (i.e., memory locations L1, L2 and L3) for performing the first and second comparison operations to ALU 107. ALU 107 receives the relevant memory locations and in response reads the values (i.e., V1, V2, V3) stored by memory locations 143, 144, and 145.

Next, ALU 107 performs the first and second comparison operations. For example, ALU 107 may determine if V1 is equal to V2 or equal to V3. Once determined, ALU 107 outputs results of the comparison operations (i.e., OP1 output and OP2 output) to PCU 111. PCU 111 analyzes the outputs of ALU 107 to determine if the results of the comparison operations satisfied the condition of instruction 124 or the condition of instruction 125. If a condition was satisfied, PCU 111 stores a true indication (e.g., 1) in the respective status register, else PCU 111 stores a false indication (e.g., 0). For the purposes of explanation, PCU 111 determines the result of the first comparison operation satisfied the condition of instruction 124 and thus stores a true indication in register 115. Further, PCU 111 determines that the result of the second comparison operation did not satisfy the condition of instruction 125 and stores a false indication in register 116.

Instruction fetch circuitry 101 also fetches a next instruction packet from memory 121. For example, instruction fetch circuitry 101 may fetch instruction packet 126 from memory 121. Instruction packet 126 is representative of a packet of instructions which includes, but is not limited to, instruction 127. Instruction 127 is representative of an MCBI (i.e., OP3) that identifies multiple status registers and a corresponding set of branch destinations. Instruction fetch circuitry 101 provides instruction packet 126 to decoder circuitry 103. In response, decoder circuitry 103 decodes instruction packet 126 and provides the relevant registers (i.e., R1 and R2) and branch destinations (i.e., L21 and L22) for performing instruction 127 to MCBC 113.

MCBC 113 receives the relevant registers and branch destinations and in response, reads the value stored by the first status register (i.e., register 115). MCBC 113 evaluates the data of register 115 to determine if the first status register has been set. Since register 115 stores a true output, (i.e., register 115 is set), MCBC 113 need not evaluate the data of register 116 and provides memory location 153 (i.e., L21) to instruction fetch circuitry 101.

Figure 4B:
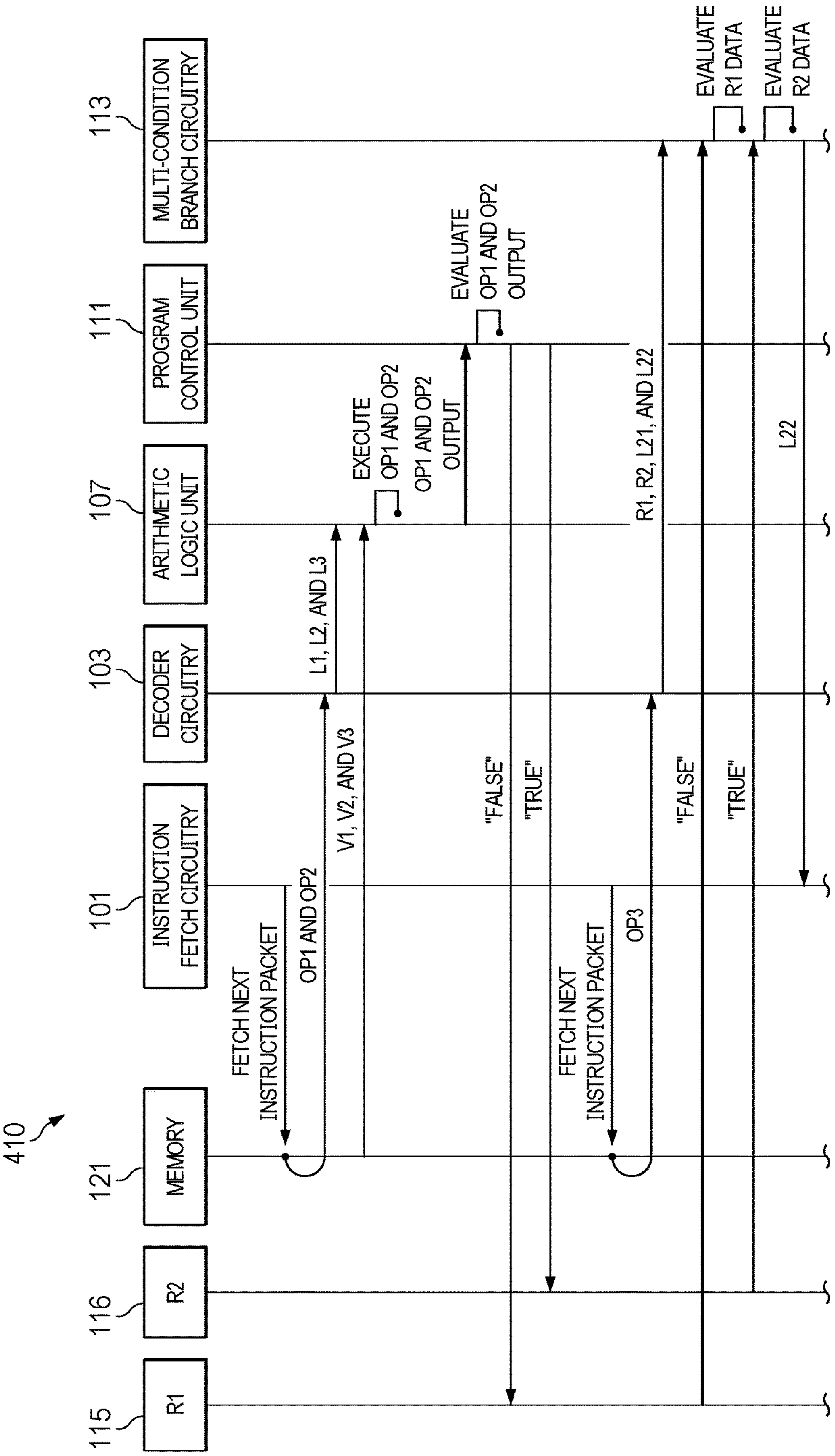

FIG. 4B illustrates operational sequence 410 in an implementation. Operational sequence 410 is representative of a variation of operational sequence 400. As such, operational sequence 410 includes register 115, register 116, memory 121, instruction fetch circuitry 101, decoder circuitry 103, ALU 107, PCU 111, and MCBC 113.

To begin, instruction fetch circuitry 101 fetches instruction packet 123 from memory 121. Instruction fetch circuitry 101 provides instruction packet 123 to decoder circuitry 103. Decoder circuitry 103 decodes instruction packet 123 and provides the relevant memory locations (i.e., L1, L2, and L3) for performing the comparison operations of instructions 124 and 125 to ALU 107.

ALU 107 receives the relevant memory locations and in response reads the values (i.e., V1, V2 and V3) stored by memory locations 143, 144, and 145. Next, ALU 107 performs the comparison operations of instructions 124 and 125 and outputs results (i.e., OP1 output and OP2 output) to PCU 111. PCU 111 analyzes the outputs of ALU 107 and determines the result of the first comparison operation did not satisfy the condition of instruction 124 and thus stores a false indication in register 115. Further, PCU 111 determines that the result of the second comparison operation satisfied the condition of instruction 125 and stores a true indication in register 116.

Instruction fetch circuitry 101 fetches instruction packet 126 from memory 121. Instruction fetch circuitry 101 provides instruction packet 126 to decoder circuitry 103. In response, decoder circuitry 103 decodes instruction packet 126 and provides the relevant registers (i.e., R1 and R2) and branch destinations (i.e., L21 and L22) for performing instruction 127 to MCBC 113.

MCBC 113 receives the relevant registers and branch destinations and in response, reads the value stored by the first status register (i.e., register 115) to determine if the first status register has been set. Since register 115 stores a false output, (i.e., register 115 is not set), MCBC 113 then reads the value stored by the second status register (i.e., register 116) to determine if the second status register has been set. Since register 116 stores a true output, (i.e., register 116 is set), MCBC 113 provides memory location 154 (i.e., L22) to instruction fetch circuitry 101.

In an implementation, if neither status register (i.e., registers 115 and 116) had been set, then MCBC 113 determines the next instruction to be executed based on a branch destination. This may include the MCBC 113 providing a default branch destination to instruction fetch circuitry 101 to determine whether the next instruction is to be fetched from memory 121. For example, MCBC 113 may provide memory location 159 to instruction fetch circuitry 101.

Alternatively, MCBC 113 may provide its output to PCU 111 to cause PCU 111 to determine the next instruction that should be fetched.

Figure 5A:
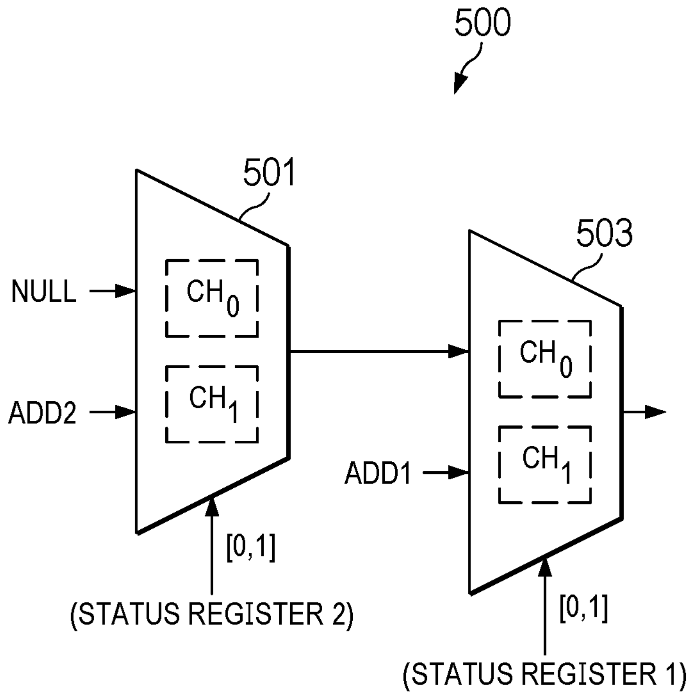
FIGS. 5A-5C illustrate a multi-condition branch circuit and related operational scenarios in an implementation.

Now turning to the next figure, FIG. 5A illustrates multi-condition branch (MCB) circuit 500 in an implementation. MCB circuit 500 is representative of circuitry configured to execute MCBIs (e.g., MCBC 113). An MCBI is representative of a program instruction which identifies multiple status registers and multiple branch destinations. The multiple status registers of the MCBI are representative of registers which store condition evaluation results (e.g., registers 115 and 116). A condition evaluation result is representative of an indication to whether a comparison operation was true or false. For example, a status register may store a one to indicate a true output and store a zero to indicate a false output. The multiple branch destinations are representative of addresses in memory which store various execution cases (e.g., memory locations 153 and 154). In an implementation, an MCBI identifies a first status register, a second status register, a first branch destination (which corresponds to the first status register), and a second branch destination (which corresponds to the second status register). MCB circuit 500 includes, but is not limited to, multiplexer (MUX) circuit 501, and MUX circuit 503.

MUX circuit 501 is representative of a 2-to-1 multiplexer which includes two input channels (i.e., $CH_0$ and $CH_1$). The first input channel of MUX circuit 501 (i.e., $CH_0$) is representative of a channel which routes a null value (i.e., NULL) to the first input channel of MUX circuit 503 (i.e., $CH_0$). It should be noted that the null value is an exemplary value and may be representative of any type of data (e.g., value, address, etc.). The second input channel of MUX circuit 501 (i.e., $CH_1$) is representative of a channel which routes the address of the second branch destination (i.e., ADD2) to the first input channel of MUX circuit 503 (i.e., $CH_0$).

Input to MUX circuit 501 includes a select input signal. The select input signal is representative of a signal which causes MUX circuit 501 to select which input channel (i.e., $CH_0$ or $CH_1$) should be used as an output channel. In an implementation, the select input signal of MUX circuit 501 is based on the condition evaluation result stored by the second status register. For example, if the second status register stores a zero, then the select input signal is low and MUX circuit 501 routes the data of the first input channel (i.e., NULL) to the first input channel of MUX circuit 503 (i.e., $CH_0$). Alternatively, if the second status register stores a one, then the select input signal is high and MUX circuit 501 routes the data of the second input channel (i.e., ADD2) to the first input channel of MUX circuit 503 (i.e., $CH_0$).

MUX circuit 503 is representative of another 2-to-1 multiplexer which also includes two input channels (i.e., $CH_0$ and $CH_1$). The first input channel of MUX circuit 503 (i.e., $CH_0$) is representative of a channel which routes the output of MUX circuit 501 (i.e., NULL or ADD2) to the appropriate circuitry. For example, the appropriate circuitry may be representative of instruction fetch circuitry (e.g., instruction fetch circuitry 101) configured to fetch instructions from memory. The second input channel of MUX circuit 503 (i.e., $CH_1$) is representative of a channel which routes the address of the first branch destination (i.e., ADD1) to the appropriate circuitry.

Input to MUX circuit 503 includes a select input signal. The select input signal is representative of a signal which causes MUX circuit 503 to select which input channel (i.e., $CH_0$ or $CH_1$) should be used as an output channel. In an implementation, the select input signal of MUX circuit 503 is based on the condition evaluation result stored by the first status register. For example, if the first status register stores a zero, then the select input signal is low and MUX circuit 503 routes the data of the first input channel (i.e., NULL or ADD2) to the appropriate circuitry. Alternatively, if the first status register stores a one, then the select input signal is high and MUX circuit 503 routes the data of the second input channel (i.e., ADD1) to the appropriate circuitry.

Figure 5B:
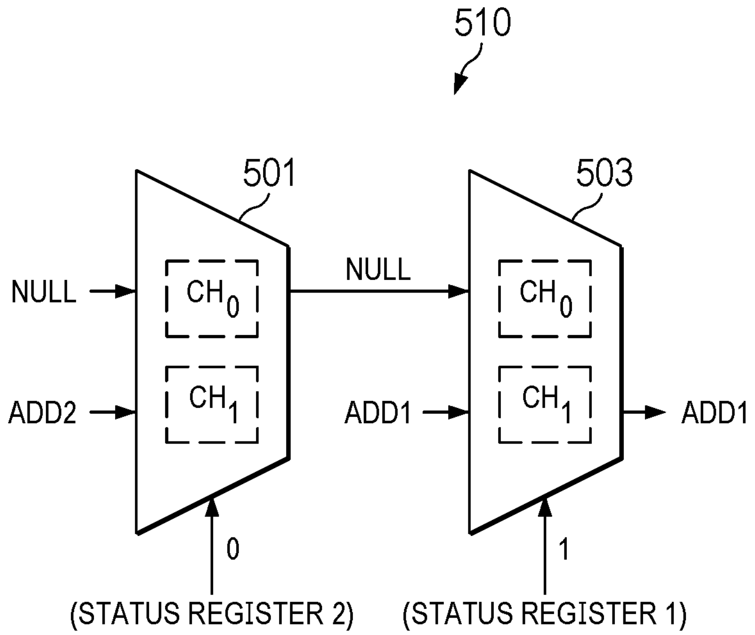

FIG. 5B illustrates operational scenario 510 in an implementation. Operational scenario 510 is representative of an example scenario for executing MCBIs, with respect to the elements of FIG. 5A. Operational scenario 510 includes MUX circuit 501, and MUX circuit 503.

To begin, MUX circuit 501 receives a select input signal based on the value stored by the second status register. Since the condition evaluation result is equal to zero, the select input signal is low, and MUX circuit 501 routes the data of the first input channel (i.e., NULL) to the first input channel of MUX circuit 503 (i.e., $CH_0$). Next, MUX circuit 503 receives a select input signal based on the value stored by the first status register. Since the condition evaluation result is equal to one, the select input signal is high, and MUX circuit 503 routes the data of the second input channel (i.e., ADD1) to the appropriate circuitry.

Figure 5C:
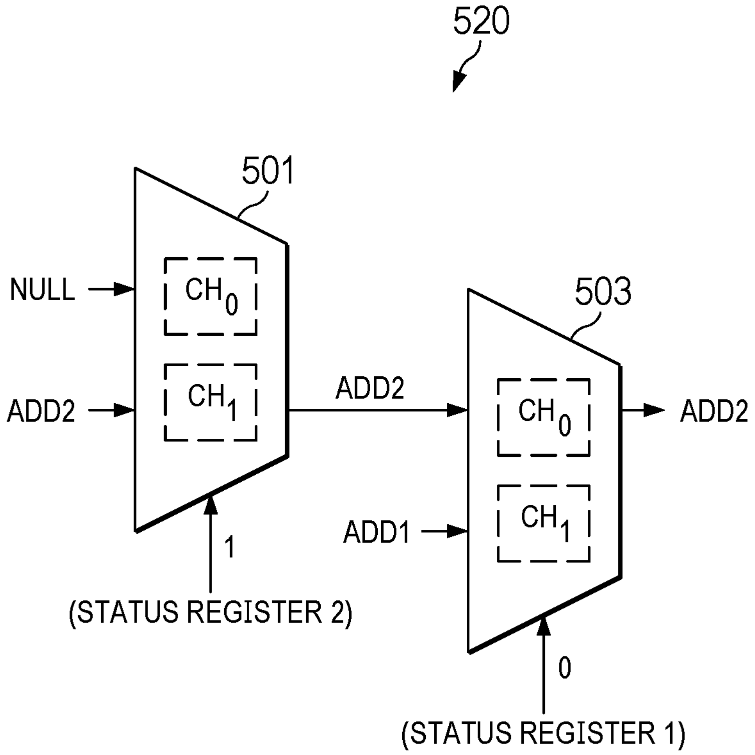

FIG. 5C illustrates operational scenario 520 in an implementation. Operational scenario 520 is representative of another example scenario for executing MCBIs, with respect to the elements of FIG. 5A. Operational scenario 520 includes MUX circuit 501, and MUX circuit 503.

To begin, MUX circuit 501 receives a select input signal based on the value stored by the second status register. Since the condition evaluation result is equal to one, the select input signal is high, and MUX circuit 501 routes the data of the second input channel (i.e., ADD2) to the first input channel of MUX circuit 503 (i.e., $CH_0$). Next, MUX circuit 503 receives a select input signal based on the value stored by the first status register. Since the condition evaluation result is equal to zero, the select input signal is low, and MUX circuit 503 routes the data of the first input channel (i.e., ADD2) to the appropriate circuitry. In an implementation, if both condition evaluation results were equal to zero, then both select input signals would be low, and MUX circuit 501 would route the data of its first input channel (i.e., NULL) to the first input channel of MUX circuit 503, and MUX circuit 503 would route the data of its first input channel (i.e., NULL) to the appropriate circuitry.

Figure 6:
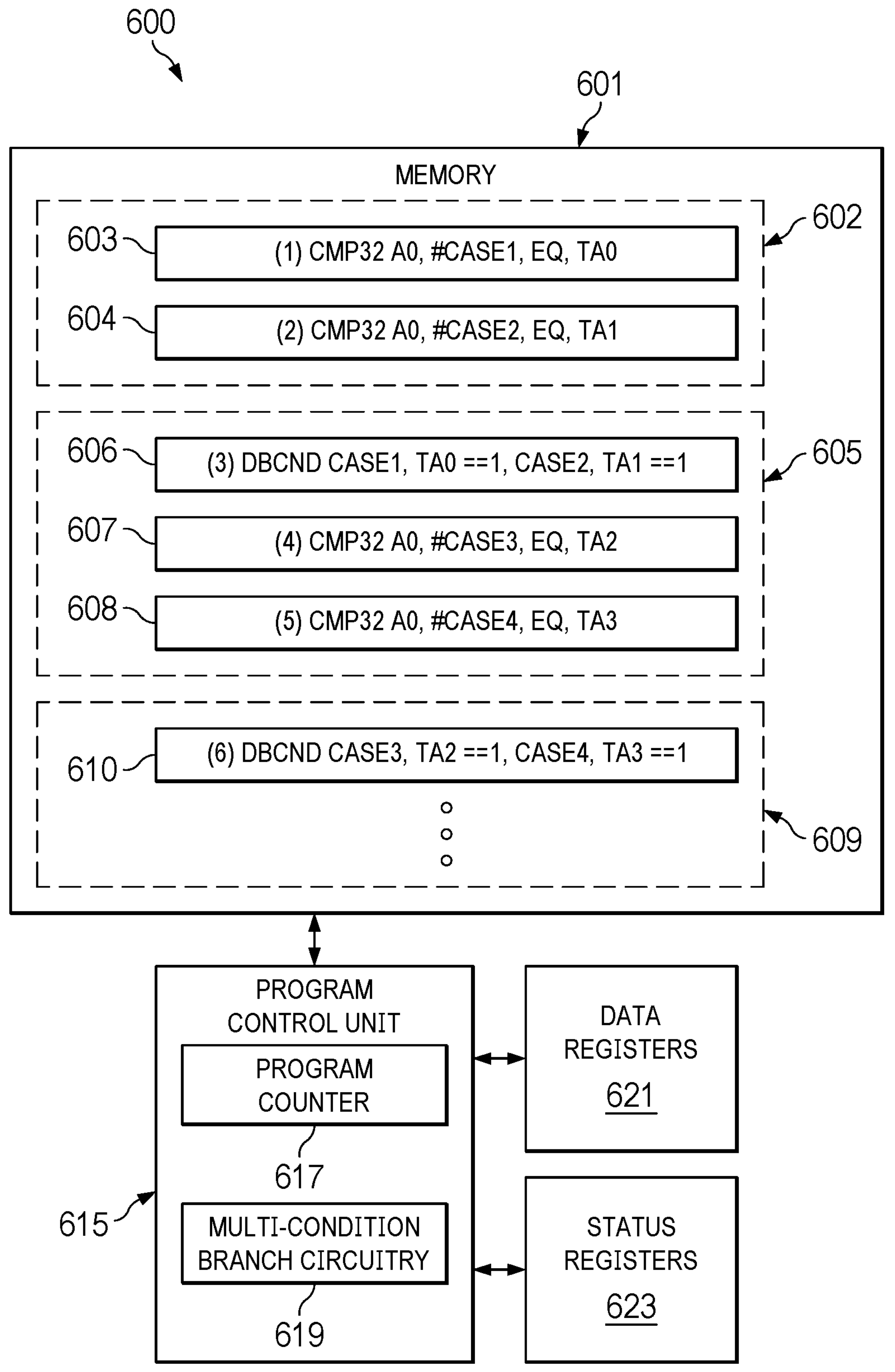
FIG. 6 illustrates an operating environment in an implementation.

FIG. 6 illustrates operating environment 600 in an implementation. Operating environment 600 is representative of another example operating environment configurable to execute program instructions. For example, operating environment 600 may be representative of operating environment 100 of FIG. 1. Operating environment 600 includes, but is not limited to, memory 601, program control unit (PCU) 615, data registers 621, and status registers 623. In some embodiments, the elements shown in operating environment 600 may be included inside a processing system, such as an MCU or a CPU. In some embodiments, some of the elements shown in operating environment 600 may be included outside of a processing system.

Memory 601 is representative of one or more volatile or non-volatile computer-readable storage media including instructions, data, and the like thereon (e.g., random access memory, flash memory). For example, memory 601 includes instruction packets 602, 605, and 609. An instruction packet is representative of a packet of one or more instructions that may be executed in a single execution cycle, or in the same number of cycles taken for executing a single conditional branch instruction (as opposed to a multi-condition branch instruction). Memory 601 may be coupled to circuitry (e.g., instruction fetch circuitry 101) configured to fetch instruction packets from memory 601 and provide instructions (of the instruction packets) to the appropriate circuitry. In an implementation memory 601 is representative of memory 121 of FIG. 1.

Instruction packet 602 is representative of first packet of instructions which may be executed in a single execution cycle. Instruction packet 602 includes instruction 603 and instruction 604. Instructions 603 and 604 are representative of condition evaluations which instruct PCU 615 to determine if an output of a comparison operation generated the desired result. In an implementation, instructions 603 and 604 each identify a comparison operation to be performed, an input memory/register location, a condition for a result of the comparison operation, and an output memory/register location. When executed, instructions 603 and 604 instruct PCU 615 to determine if the data stored by a register of data registers 621 is equal to a specified value and output a result of its determination to a register of status registers 623.

In an implementation, the specified value of a condition evaluation is representative of an identifier for an execution case. For example, the specified value of instruction 603 equals the number one (i.e., #CASE1), while the specified value of instruction 604 equals the number two (i.e., #CASE2). When executed, instructions 603 and 604 direct PCU 615 to determine if the data stored by a register of data registers 621 is equal to the number one or the number two. Instructions 603 and 604 further direct PCU 615 to output an indicator (e.g., 1 or 0) to whether the comparison operations of each instruction were true or false to a corresponding register of status registers 623.

Instruction packet 605 is representative of a second packet of instructions which may be executed in a single execution cycle or in the same number of cycles taken for executing a single conditional branch instruction. Meaning, instruction packet 605 may be executed in one execution cycle or, if needed, the same number of execution cycles taken for performing a single conditional branch operation. In an implementation, instruction packet 605 is executed after the execution of instruction packet 602. Instruction packet 605 includes instruction 606, instruction 607, and instruction 608.

Instruction 606 is representative of a multi-condition branch instruction (MCBI) which identifies multiple status registers and multiple branch destinations. The multiple status registers of instruction 606 are representative of registers which store condition evaluation results, such as status registers 623. The multiple branch destinations are representative of locations in memory that store execution cases which PCU 615 may branch to. When executed, instruction 606 causes MCBC 619 to determine the appropriate branch destination to output based on the results of instructions 603 and 604. In an implementation, MCBC 619 outputs the appropriate branch destination to PCU 615. In response, PCU 615 branches to the specified destination in memory.

Alternatively, instructions 607 and 608 are representative of condition evaluations which instruct PCU 615 to determine if an output of a comparison operation generated the desired result. Instructions 607 and 608 each identify a comparison operation to be performed, an input memory/register location, a condition for a result of the comparison operation, and an output memory/register location. When executed, instructions 607 and 608 instruct PCU 615 to determine if the data stored by a register of data registers 621 is equal to a specified value (i.e., the number 3 or the number 4) and output a result of its determination to a register of status registers 623.

Instruction packet 609 is representative of a third packet of instructions which may also be executed in a single execution cycle or in the same number of cycles taken for executing a single conditional branch instruction. Meaning, instruction packet 609 may be executed in one execution cycle or, if needed, the same number of execution cycles taken for performing a single conditional branch operation. In an implementation, instruction packet 609 is executed after the execution of instruction packet 605. Instruction packet 609 includes, but is not limited to, instruction 610.

Instruction 610 is representative of another MCBI which identifies multiple status registers and multiple branch destinations. When executed, instruction 610 causes MCBC 619 to determine the appropriate branch destination to output based on the results of instructions 607 and 608. In an implementation, MCBC 619 outputs the appropriate branch destination to PCU 615. In response, PCU 615 branches to the specified destination in memory.

PCU 615 is representative of one or more circuits configured to manage the execution of program code (e.g., PCU 111). PCU 615 is further representative of circuitry configured to perform condition evaluations and store the results of the condition evaluations in status registers 623. For example, PCU 615 may execute instructions 603, 604, 607, and 608. In an implementation, PCU 615 is coupled to an arithmetic logic unit (e.g., ALU 107) configured to perform arithmetic logic operations. For example, the arithmetic logic unit may perform the comparison operations identified by instructions 603, 604, 607, and 608. PCU 615 may then evaluate the output of the arithmetic logic unit to determine if the comparison operation satisfied the condition of the respective instruction. PCU 615 includes program counter 617 and MCBC 619.

Program counter 617 is representative of a register which stores the memory location for the instruction which is currently being executed. For example, if PCU 615 is currently executing instruction 603, then program counter 617 stores the address that corresponds to the location in memory 601 which stores instruction 603. In an implementation, program counter 617 may be representative of multiple registers which store the memory locations for the instructions which are currently being executed in parallel.

MCBC 619 is representative of one or more circuits configured to execute MCBIs within a single execution cycle or the cycles taken for a single conditional branch. For example, MCBC 619 may execute instructions 606 and 610. In an implementation MCBC 619 is representative of MCBC 113 of FIG. 1 or MCB circuit 500 of FIG. 5A.

Data registers 621 represent memory locations that store data and/or instruction for use during the execution of program code. Data registers 621 may be representative of addressing registers, fixed-point registers, floating-point registers, or a combination thereof. As such, data registers 621 may store addressing data, fixed-point data, floating-point data, or a combination of data types. In an implementation, PCU 615 performs the condition evaluations with respect to the data stored by data registers 621.

Status registers 623 also represent memory locations that store data and/or instruction for use during the execution of program code. Status registers 623 may be representative of interrupt status registers, decode phase status registers, execute phase status registers, or a combination thereof. In an implementation, status registers 623 are representative of the registers which store condition evaluation results, such as registers 115 and 116 of FIG. 1. PCU 615 may output condition evaluation results to status registers 623 and MCBC 619 may analyze the data of status registers 623 to form a determination. In an implementation, status registers 623 include four separate registers for storing the results of the condition evaluations.

Figure 7A:
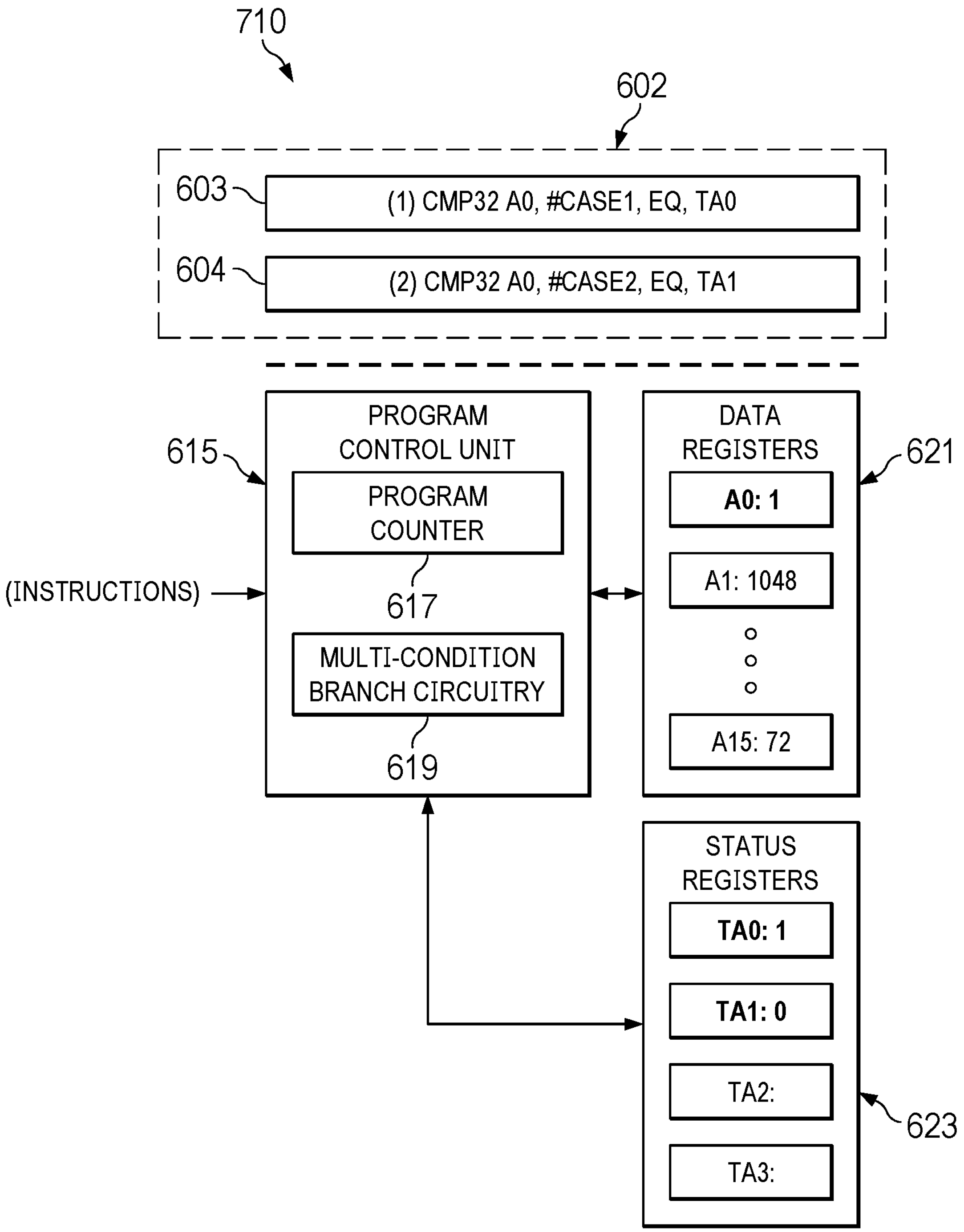
FIGS. 7A-7C illustrate an operational scenario in an implementation.
Figure 7B:
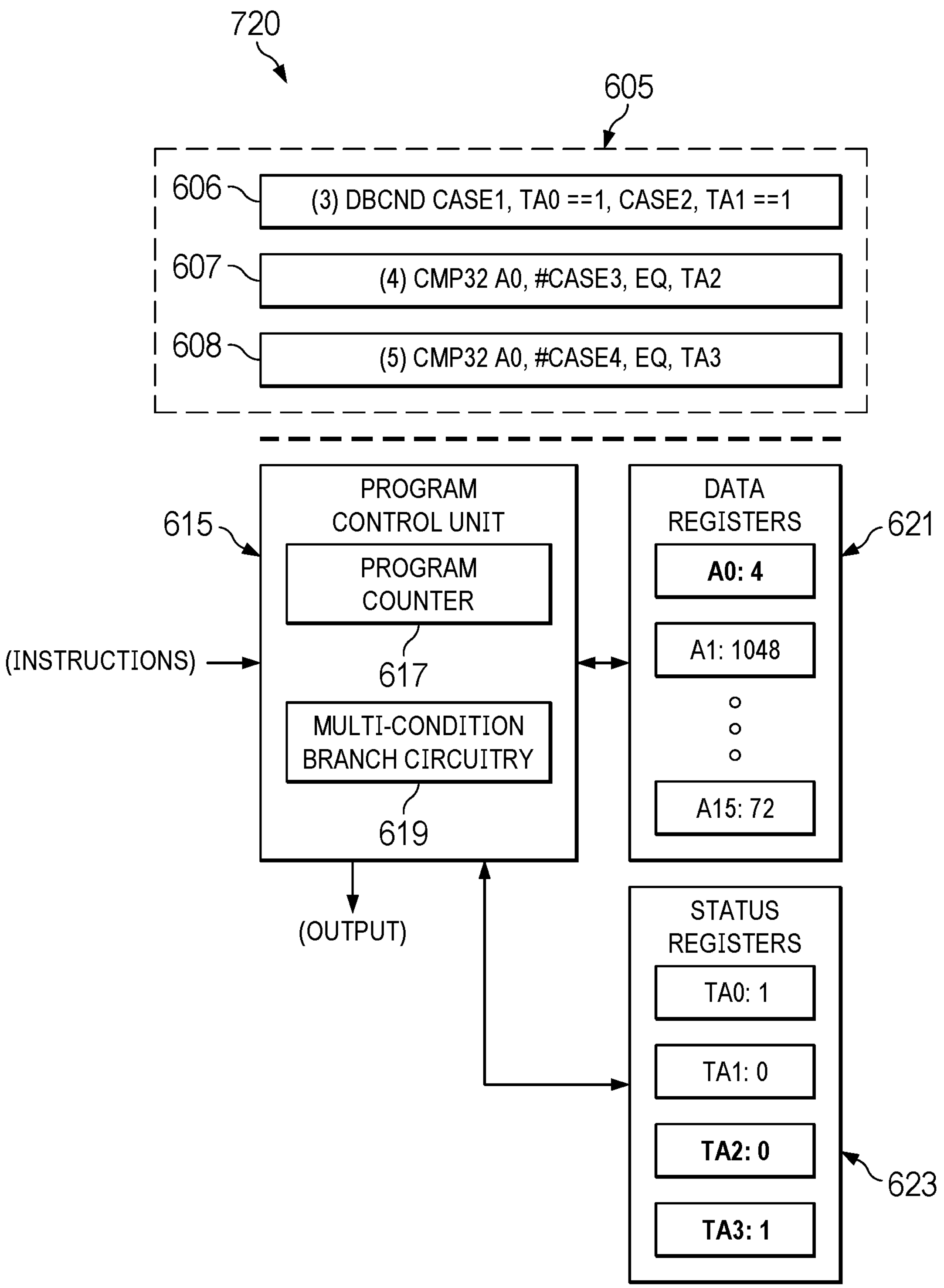
Figure 7C:
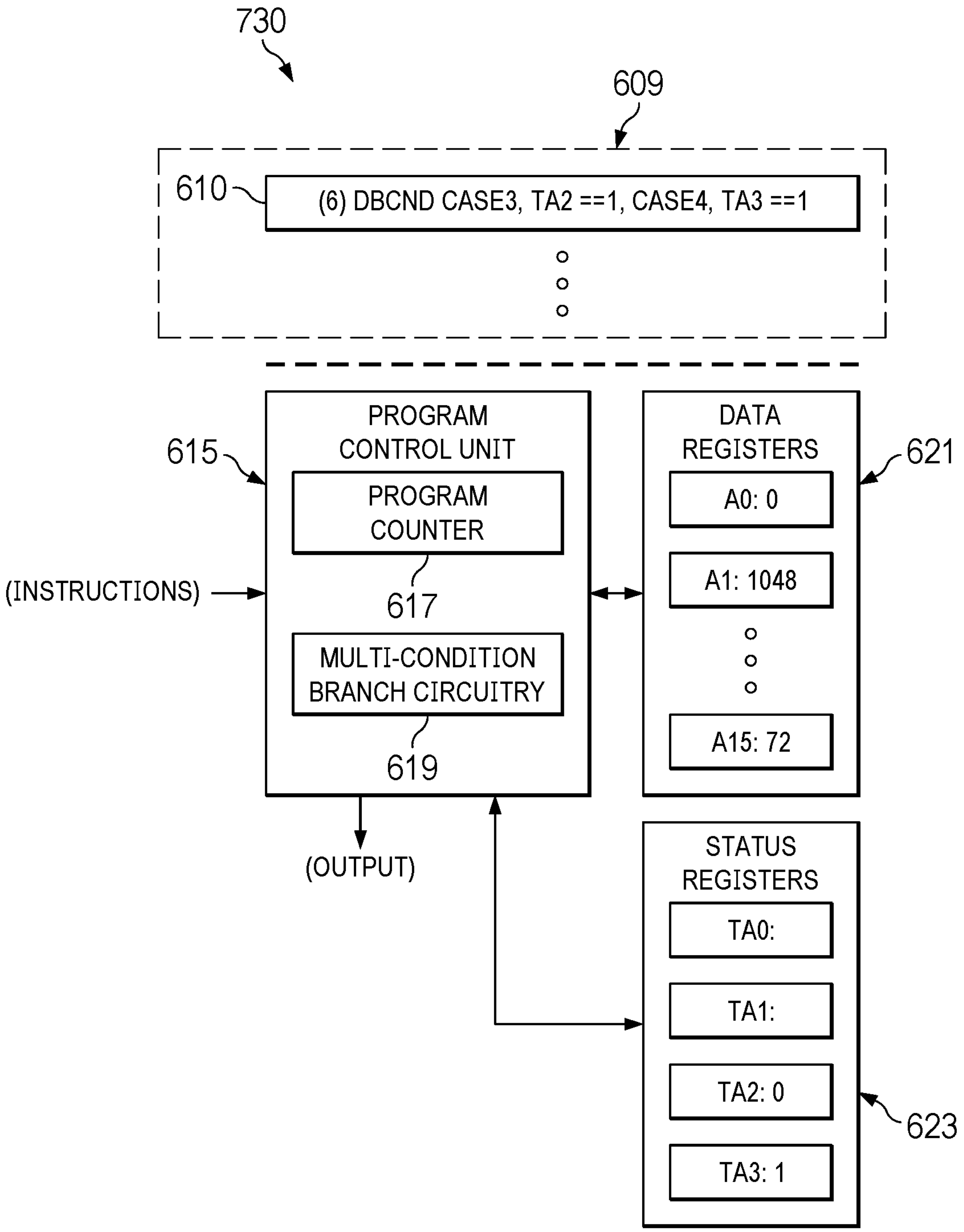

FIGS. 7A, 7B, and 7C illustrate an operational scenario for executing program code in an implementation. More specifically, FIGS. 7A-7C illustrate a sequence of stages for executing MCBIs with respect to the elements of FIG. 6. In an implementation, FIG. 7A depicts a first stage of operation, FIG. 7B depicts a second stage of operation, and FIG. 7C depicts a third stage of operation.

Now turning to FIG. 7A, stage 710 is representative of the first stage of operation. In an implementation, stage 710 depicts the operations which occur during a first execution cycle. Stage 710 includes instruction packet 602, PCU 615, data registers 621, and status registers 623.

To begin, PCU 615 receives instructions 603 and 604. In response, PCU 615 identifies the register within data registers 621 for performing instructions 603 and 604. Once identified, PCU 615 determines if the data stored by register A0 is equal to one or two. In an implementation, an arithmetic logic unit (not shown) determines if the data stored by register A0 is equal to one or two and outputs a result to PCU 615. If the arithmetic logic unit determines the data of register A0 is equal to one, then PCU 615 stores a true indication (i.e., 1) in the status register identified by instruction 603 and stores a false indication (i.e., 0) in the status register identified by instruction 604. Alternatively, if the arithmetic logic unit determines the data of register A0 is equal to two, then PCU 615 stores a false indication in the status register identified by instruction 603 and stores a true indication in the status register identified by instruction 604. Since the data of register A0 is equal to one, PCU 615 stores a one in register TA0 and stores a zero in register TA1.

FIG. 7B illustrates stage 720 which is representative of the second stage of operation. In an implementation, stage 720 depicts the operations which occur during a second execution cycle. Stage 720 includes instruction packet 605, PCU 615, data registers 621, and status registers 623.

To begin, MCBC 619 receives instruction 607 while PCU 615 receives instructions 608 and 609. In response MCBC 619 and PCU 615 identify the relevant registers for performing the respective instructions. Instruction 607 is representative of an MCBI which instructs MCBC 619 to evaluate the data of registers TA0 and TA1 and determine which, if either, register is set. MCBC 619 first evaluates the data of register TA0, and if set, MCBC 619 outputs the branch destination which corresponds to register TA0 being set. Alternatively, if TA0 is not set, MCBC 619 then evaluates the data of register TA1. If register TA1 is set, MCBC 619 outputs the branch destination which corresponds to register TA1 being set. Since register TA0 is set, MCBC 619 does not evaluate the data of register TA1 and instead outputs the branch destination which corresponds to register TA0 being set.

Instructions 608 and 609 are representative of condition evaluations which instruct PCU 615 to determine if the data stored by register A0 is equal to three or four. Since the data of register A0 is equal to four, PCU 615 stores a zero in register TA2 and stores a one in register TA3. It should be noted that while MCBC 619 executes instruction 606, PCU 615 may simultaneously execute instructions 607 and 608.

FIG. 7C illustrates stage 730 which is representative of the third stage of operation. In an implementation, stage 730 depicts the operations which occur during a third execution cycle. Stage 730 includes instruction packet 609, PCU 615, data registers 621, and status registers 623.

To begin, MCBC 619 receives instruction 610 and in response identifies the relevant registers for performing instruction 610. Instruction 610 is representative of an MCBI which instructs MCBC 619 to evaluate the data of registers TA2 and TA3 and determine which, if either, register is set. MCBC 619 first evaluates the data of register TA2 and determines register TA2 has not been set. MCBC 619 then evaluates the data of register TA3 and determines register TA3 has been set. As such, MCBC 619 outputs the branch destination which corresponds to register TA3 being set to PCU 615.

Figure 8:
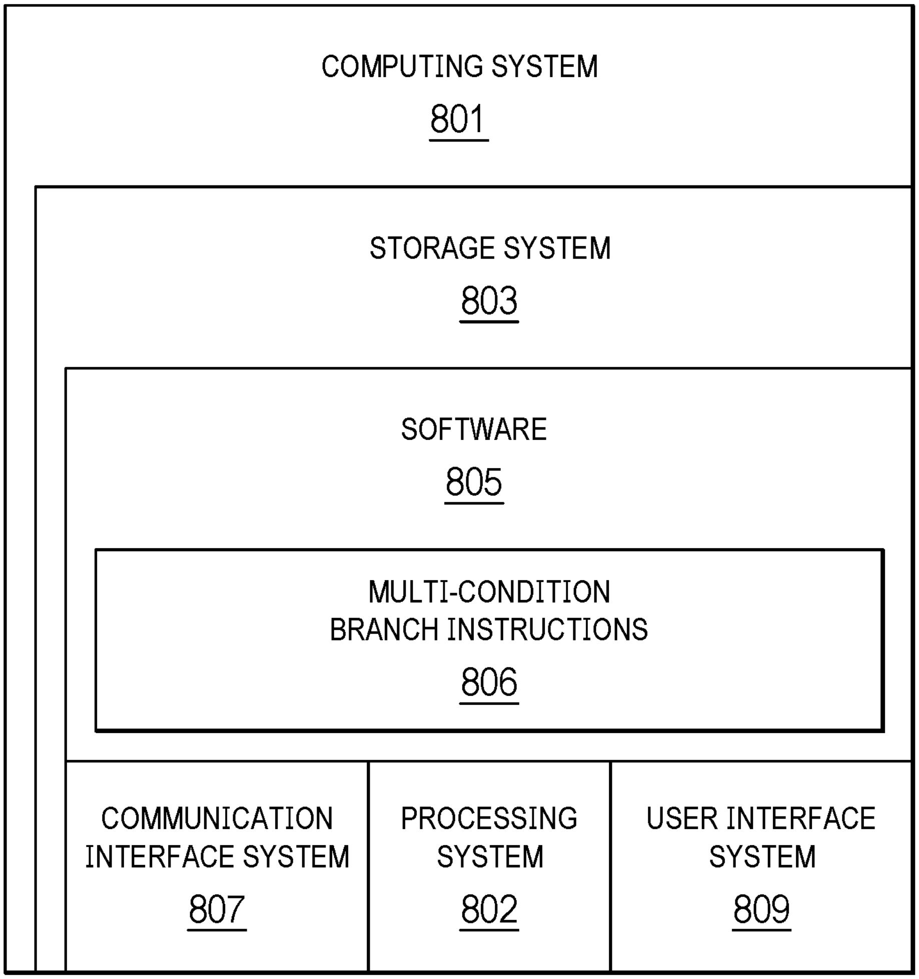
FIG. 8 illustrates a computing system suitable for implementing the various operational environments, architectures, processes, scenarios, and sequences discussed below with respect to the other Figures.

FIG. 8 illustrates an example computer system that may be used in various implementations. For example, computing system 801 is representative of a computing device capable of executing software comprised of program instructions having multi-condition branch instructions as described herein. Computing system 801 is representative of any system or collection of systems with which the various operational architectures, processes, scenarios, and sequences disclosed herein for conditional branching may be employed. Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809 (optional). Processing system 802 is operatively coupled with storage system 803, communication interface system 807, and user interface system 809. Computing system 801 may be representative of a cloud computing device, distributed computing device, or the like.

Processing system 802 loads and executes software 805 from storage system 803, or alternatively, runs software 805 directly from storage system 803. Software 805 includes and implements multi-condition branch instructions (MCBIs) 806, which are representative of any of the multi-condition branch instructions discussed with respect to the preceding Figures (e.g., instruction 127, instruction 606, and instruction 610). When executed by processing system 802, software 805 (including instruction 127, instruction 606, and instruction 610) directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, digital signal processing units, data processing units, application specific processors, and logic devices, as well as any other type of processing device, combinations, or variations thereof. Processing system 802 includes special purpose circuitry capable of executing MCBIs, examples of which include MCBC 113, MCB circuit 500, and MCBC 619.

Storage system 803 may comprise any computer readable storage media readable and writeable by processing system 802 and capable of storing software 805. Storage system 803 may include volatile and nonvolatile, removable and nonremovable, mutable and non-mutable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including MCBIs 806) may be implemented in program instructions and among other functions may, when executed by processing system 802, direct processing system 802 to operate as described with respect to the various operational scenarios, sequences, and processes illustrated herein. For example, software 805 includes MCBIs for implementing multi-condition branch operations as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded environment, in a single processor or multi-processor environment, in a single host or multi-host environment, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to provide memory access as described herein. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A system, comprising:
instruction fetch circuitry;
decoder circuitry coupled to the instruction fetch circuitry; and
multi-condition branch circuitry coupled to the decoder circuitry, wherein the multi-condition branch circuitry comprises a first multiplexer (MUX) and a second MUX coupled to the first MUX; and
wherein the instruction fetch circuitry is configured to:
fetch a multi-condition branch instruction from a memory, wherein the multi-condition branch instruction identifies a set of registers and a set of branch destinations, wherein each branch destination of the set of branch destinations corresponds to a respective register of the set of registers, and wherein the set of branch destinations include a first branch destination and a second branch destination; and
provide the multi-condition branch instruction to the decoder circuitry;
wherein the decoder circuitry is configured to cause the multi-condition branch circuitry to execute the multi-condition branch instruction; and
wherein to execute the multi-condition branch instruction:
the first MUX is configured to determine, based on a second select input signal, whether to route the second branch destination or a null value to the second MUX; and
the second MUX is configured to determine, based on a first select input signal, whether to route the first branch destination, the second branch destination, or the null value to the instruction fetch circuitry.

2. The system of claim 1 wherein the set of registers include a first register that holds a first condition evaluation result and a second register that holds a second condition evaluation result, and wherein the first branch destination corresponds to the first condition evaluation result and the second branch destination corresponds to the second condition evaluation result.

3. The system of claim 2 wherein the first select input signal corresponds to the first condition evaluation result, wherein the second select input signal corresponds to the second condition evaluation result, wherein the first condition evaluation result indicates whether a first comparison operation between a first variable and a second variable is true or false, and wherein the second condition evaluation result indicates whether a second comparison operation between the first variable and a third variable is true or false.

4. The system of claim 3 wherein the first MUX is configured to:
determine to route a second address corresponding to the second branch destination to the second MUX when the second select input signal indicates the second comparison operation is true; and
determine to route the null value to the second MUX when the second select input signal indicates the second comparison operation is false.

5. The system of claim 1 further comprising a program control unit (PCU), wherein the PCU includes the multi-condition branch circuitry.

6. The system of claim 1 wherein the first MUX includes two input channels, and wherein the second MUX includes two other input channels.

7. The system of claim 4 wherein the second MUX is configured to:
determine to route the second address to the instruction fetch circuitry when the second select input signal indicates the second comparison operation is true and the first select input signal indicates the first comparison operation is false;
determine to route the null value to the instruction fetch circuitry when the second select input signal indicates the second comparison operation is false and the first select input signal indicates the first comparison operation is false; and
determine to route a first address corresponding to the first branch destination to the instruction fetch circuitry when the first select input signal indicates the first comparison operation is true.

8. The system of claim 2 wherein the set of registers further include a third register that holds a third condition evaluation result and a fourth register that holds a fourth condition evaluation result, and wherein the set of branch destinations further include a third branch destination that corresponds to the third condition evaluation result and a fourth branch destination that corresponds to the fourth condition evaluation result.

9. A computing apparatus comprising:
a memory device; and
one or more processors operatively coupled with the memory device, wherein the one or more processors include a first multiplexer (MUX) circuit and a second MUX circuit coupled to the first MUX circuit; and
wherein the one or more processors are configured to at least:
fetch a multi-condition branch instruction from a memory, wherein the multi-condition branch instruction identifies a set of registers and a set of branch destinations, wherein each branch destination of the set of branch destinations corresponds to a respective register of the set of registers, and wherein the set of branch destinations include a first branch destination and a second branch destination; and
execute the multi-condition branch instruction;
wherein to execute the multi-condition branch instruction:
the first MUX circuit is configured to determine, based on a second select input signal, whether to route the second branch destination or a null value to the second MUX circuit; and
the second MUX circuit is configured to determine, based on a first select input signal, whether to output the first branch destination, the second branch destination, or the null value.

10. The computing apparatus of claim 9 wherein the set of registers include a first register that holds a first condition evaluation result and a second register that holds a second condition evaluation result, and wherein the first branch destination corresponds to the first condition evaluation result and the second branch destination corresponds to the second condition evaluation result.

11. The computing apparatus of claim 10 wherein the first select input signal corresponds to the first condition evaluation result, wherein the second select input signal corresponds to the second condition evaluation result, wherein the first condition evaluation result indicates whether a first comparison operation between a first variable and a second variable is true or false, and wherein the second condition evaluation result indicates whether a second comparison operation between the first variable and a third variable is true or false.

12. The computing apparatus of claim 11 wherein the first MUX circuit is configured to:
determine to route a second address corresponding to the second branch destination to the second MUX circuit when the second select input signal indicates the second comparison operation is true; and determine to route the null value to the second MUX circuit when the second select input signal indicates the second comparison operation is false.

13. The computing apparatus of claim 9 wherein the first MUX circuit includes two input channels and the second MUX circuit includes two other input channels.

14. The computing apparatus of claim 12 wherein the second MUX circuit is configured to:

determine to output the second address when the second select input signal indicates the second comparison operation is true and the first select input signal indicates the first comparison operation is false;

determine to output the null value when the second select input signal indicates the second comparison operation is false and the first select input signal indicates the first comparison operation is false; and determine to output a first address corresponding to the first branch destination when the first select input signal indicates the first comparison operation is true.

15. One or more non-transitory computer-readable storage media, comprising:

program instructions stored thereon comprising a multi-condition branch instruction that identifies a set of registers and a set of branch destinations, wherein each branch destination of the set of branch destinations corresponds to a respective register of the set of registers, wherein the set of branch destinations include a first branch destination and a second branch destination, and wherein the program instructions, when read and executed by processing circuitry including a first multiplexer (MUX) circuit and a second MUX circuit coupled to the first MUX circuit, direct the processing circuitry to:

execute the multi-condition branch instruction, wherein to execute the multi-condition branch instruction:

the first MUX circuit is configured to determine, based on a second select input signal, whether to route the second branch destination or a null value to the second MUX circuit; and the second MUX circuit is configured to determine, based on a first select input signal, whether to output the first branch destination, the second branch destination, or the null value.

16. The one or more non-transitory computer-readable storage media of claim 15 wherein the set of registers include a first register that holds a first condition evaluation result and a second register that holds a second condition evaluation result, and wherein the first branch destination corresponds to the first condition evaluation result and the second branch destination corresponds to the second condition evaluation result.

17. The one or more non-transitory computer-readable storage media of claim 16 wherein the first select input signal corresponds to the first condition evaluation result, wherein the second select input signal corresponds to the second condition evaluation result, wherein the first condition evaluation result indicates whether a first comparison operation between a first variable and a second variable is true or false, and wherein the second condition evaluation result indicates whether a second comparison operation between the first variable and a third variable is true or false.

18. The one or more non-transitory computer-readable storage media of claim 17 wherein the first MUX circuit is configured to:

determine to route a second address corresponding to the second branch destination to the second MUX circuit when the second select input signal indicates the second comparison operation is true; and determine to route the null value to the second MUX circuit when the second select input signal indicates the second comparison operation is false.

19. The one or more non-transitory computer-readable storage media of claim 15 wherein the first MUX circuit includes two input channels and the second MUX circuit includes two other input channels.

20. The one or more non-transitory computer-readable storage media of claim 18 wherein the second MUX circuit is configured to:

determine to output the second address when the second select input signal indicates the second comparison operation is true and the first select input signal indicates the first comparison operation is false;

determine to output the null value when the second select input signal indicates the second comparison operation is false and the first select input signal indicates the first comparison operation is false; and determine to output a first address corresponding to the first branch destination when the first select input signal indicates the first comparison operation is true.

* * * * *